United States Patent [19]
Minamihata et al.

[11] 3,832,572
[45] Aug. 27, 1974

[54] CIRCUIT FOR DELAYING AND SHAPING SYNCHRONIZING PULSE

[75] Inventors: Shigeaki Minamihata; Masayasu Niimi, both of Tokyo, Japan

[73] Assignee: Hitachi, Ltd., Tokyo, Japan

[22] Filed: Aug. 7, 1973

[21] Appl. No.: 386,404

[30] Foreign Application Priority Data

Aug. 9, 1972 Japan .............................. 47-79138

[52] U.S. Cl. .................. 307/106, 307/234, 328/135
[51] Int. Cl. ............................................ H03k 3/00
[58] Field of Search ........... 307/106, 234, 235, 265, 307/268; 328/54, 31, 135

[56] References Cited

UNITED STATES PATENTS

| | | | |
|---|---|---|---|
| 3,130,371 | 4/1964 | Copeland | 328/135 |
| 3,426,210 | 2/1969 | Agin | 328/31 |
| 3,757,132 | 9/1973 | Nilsson | 307/106 |
| 3,790,894 | 2/1974 | Iizuka et al. | 328/135 |

*Primary Examiner*—David Smith, Jr.
*Attorney, Agent, or Firm*—Craig & Antonelli

[57] ABSTRACT

A synchronizing pulse delaying and shaping circuit includes an integration circuit, a clamping circuit, a differential amplifier and a reference power source. The clamping circuit includes a coupling capacitor and a diode. A synchronizing pulse is applied to the integration circuit, to be shaped into an integrated waveform. The intergrated signal has its DC component blocked by the coupling capacitor, and the resultant signal is superimposed on a reference voltage of the reference power source. The superimposed signal is partially clamped by the diode and the reference power source. Current flows through the diode in the forward direction, with the result that the coupling capacitor is discharged. When the peak level of the clamped signal is thus lowered to a predetermined value, the clamped signal voltage is compared with the reference voltage by the differential amplifier. Then, an output pulse is provided.

3 Claims, 7 Drawing Figures

CIRCUIT FOR DELAYING AND SHAPING SYNCHRONIZING PULSE

BACKGROUND OF THE INVENTION

1. Field of the Invention

The present invention relates to a pulse delaying and shaping circuit. More particularly, it relates to an improved synchronizing pulse delaying and shaping circuit which comprises a smaller number of capacitors.

2. Description of the Prior Art

In, for example, a color television circuit, delayed forms of the fly-back pulse and the horizontal synchronizing pulse have been employed to gate the color burst signal. Although the fly-back pulse normally has a good phase position, it is large in width, and therefore the phase position has a tendency to become unstable. Although, on the other hand, the horizontal synchorniz-ing pulse has a stable phase position, it has a leading phase slightly earlier in time than the color burst signal. Accordingly, in the case of use of the fly-back pulse where the pulse width of a sampled pulse becomes large, it is found that the chrominance signal is also sampled at the time of burst sampling. As a result of the horizontal synchronizing pulse leading in phase and the fly-back pulse being unstable in phase, the efficiency of synchronous detection is degraded.

In order to eliminate the aforesaid disadvantages, the inventor has previously developed a synchronizing pulse delaying and shaping circuit, as shown in FIG. 1 of the accompanying drawings.

In the figure a horizontal synchronizing pulse after passing through an integration circuit (not shown) is applied to an input terminal 1. The imput signal has its DC component blocked by a coupling capacitor $C_1$, so that a signal *a* having the waveform illustrated in FIG. 2(A) is produced at a point *a* in FIG. 1. The signal *a* is peak-detected by an N-P-N transistor $Q_2$ and a capacitor $C_2$, to produce a level signal *b*, as seen in FIG. 2(A), at a point *b* in FIG. 1. The level signal *b* is subjected to voltage division by resistors $R_1$ and $R_2$, to generate a level signal *c*, as seen in FIG. 2(A), at a point *c* connected to the base of an N-P-N transistor $Q_3$.

The level signal *c* is compared with the waveform signal *a* by a differential amplifier, which consists of N-P-N transistors $Q_1$ and $Q_3$. As a result, a signal *d* of a waveform shown in FIG. 2(B) is obtained at an output terminal 2. That is, a pulse delayed by a period ($t_2 - t_1$) appears at the output terminal 2. The prior art circuit effects the accurate delay and shaping of the synchronizing pulse by such operation.

With the circuit of the above construction, however, the capacitor $C_2$ for the peak detection is of a large capacity, so that terminals for outside connection are additionally required when the circuit is manufactured in the form of an integrated circuit (IC). Further, as many as two capacitors each occupying a larger area than other circuit elements are required for storage of the DC reference voltage ($C_2$) and for coupling the AC signal ($C_1$). Another problem of the prior art circuit is that the width of the output pulse changes due to the level change of the input signal.

SUMMARY OF THE INVENTION

An object of the present invention is to provide an improved synchronizing pulse delaying and shaping circuit which solves the above-mentioned problems of the previous circuit.

In accordance with the present invention, there is provided a synchronizing pulse delaying and shaping circuit comprising an integration circuit which receives an input pulse, a coupling capacitor having one end connected to the output of the integration circuit, a differential amplifier having one input terminal connected to the other end of the coupling capacitor, a bias power source connected to the other input terminal of the differential amplifier, and a parallel circuit which consists of a diode and a resistor connected between the one terminal and the other terminal of the differential amplifier.

BRIEF DESCRIPTION OF THE DRAWINGS

FIG. 1 is a schematic circuit diagram of the synchronizing pulse delaying and shaping circuit, which figure has been already referred to;

FIGS. 2(A) and 2(B) are waveform diagrams of the signals at the various parts of the circuit of FIG. 1, which figures also have been previously referred to;

PREFERRED EMBODIMENT OF THE INVENTION

Figure 1:
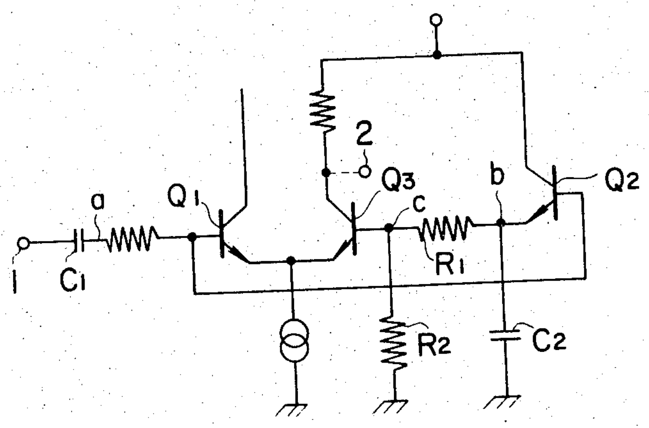
Figures 2A, 2B:
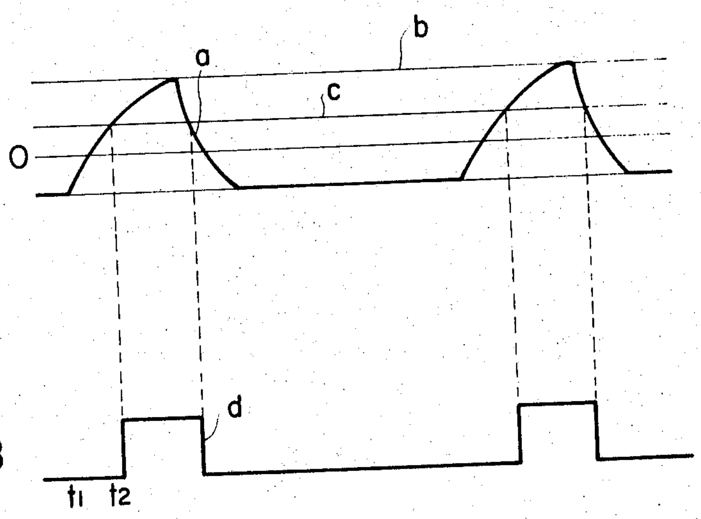
Figure 3:
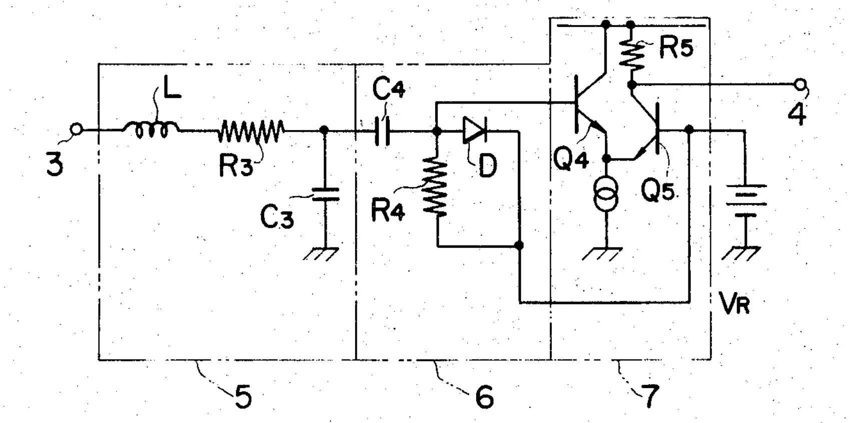
FIG. 3 is a schematic circuit diagram of an embodiment of an improved synchronizing pulse delaying and shaping circuit according to the present invention.

Referring to FIGS. 3 and 4, the present invention will be described in detail in connection with an embodiment thereof.

Figure 4A:
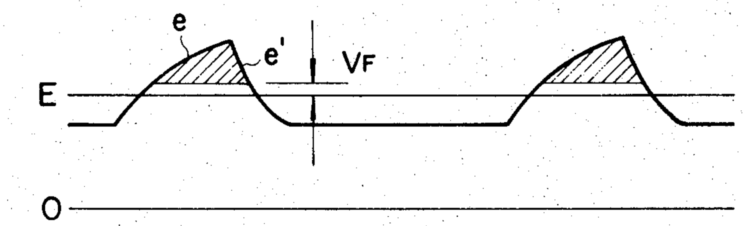
FIGS. 4(A), 4(B), and 4(C) are waveform diagrams of signals at various parts of the circuit of FIG. 3, respectively.

FIG. 3 shows the circuit arrangement of an embodiment of the synchronizing pulse delaying and shaping circuit according to the present invention. In the figure, numeral 3 designates a horizontal synchronizing pulse-input terminal to which horizontal synchronizing pulses are applied. The horizontal synchronizing pulse is shaped into an integrated waveform by a delay circuit which consists of a coil L, a resistor $R_3$ and a capacitor $C_3$. The integrated input signal has its DC component blocked by a coupling capacitor $C_4$. The resultant signal is superimposed on a DC voltage E of a reference power source $V_R$, so as to have the waveform of a signal *e* shown in FIG. 4(A). Hereupon, the superimposed signal *e* has a part *e'* clamped by a diode D and the reference power source $V_R$, the part exceeding $(E + V_F)$ illustrated by oblique shade lines in FIG. 4(A). Then, the clamped signal shown at *e'* in FIG. 4(A) is applied to the base of the N-P-N transistor $Q_4$. The value $V_F$ denotes the forward drop voltage of the diode D.

Figures 4B, 4C:
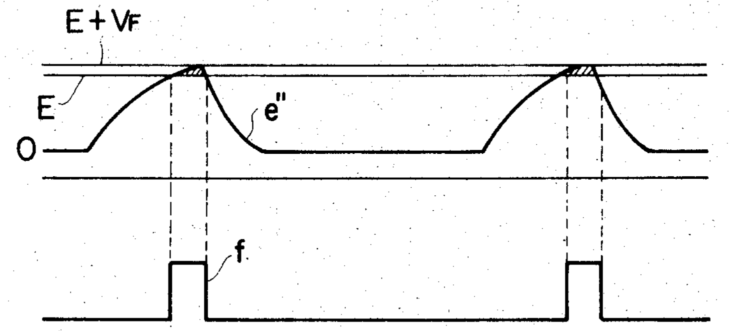

Due to the clamp, a current flows through the diode D in the forward direction to the amount of the oblique line part of the signal of the waveform *e*. Simultaneously therewith, the capacitor $C_4$ is discharged. As a result, the level of the signal of the waveform *e* lowers all over, to change the clamp level of the waveform *e*. Thereafter, similar repeated operations are carried out, and a signal of a waveform *e''* illustrated in FIG. 4(B) is obtained. At this time, the signal of waveform *e''* is level-compared with the reference voltage E by a differential amplifier 7 which includes transistors $Q_4$ and $Q_5$, and a resistor $R_5$. Thus, a signal of a waveform *f* shown in FIG. 4(C) is produced at an output terminal 4 at the phase of the oblique shade line portion of the signal of the waveform *e''*.

In this case, the output impedance of the delay circuit 5 as viewed from the clamping circuit 6 consisting of the capacitor $C_4$, diode D and resistor R is so selected as to be sufficiently small. For this reason, the integrated waveform signal outputted from the delay circuit 5 presents the normal waveform even if the level of the synchronizing input pulse is slightly lower. In addition, the time constant between the resistor $R_4$ and the storage coupling capacitor $C_4$ is made sufficiently larger than the width of the horizontal synchronizing pulse. For this reason, the stability of the signal of the waveform *e''* is good, and the stability of the pulse width of the output pulse is accordingly good. Further, the time constant between the resistor $R_4$ and the capacitor $C_4$ and the output impedance of the delay circuit 5 are appropriately selected. For this reason, the peak level of the normal integrated waveform can be made sufficiently large with respect to the forward drop voltage of the diode D, and the level position for the clamp can be so set as to be substantially proportional to the peak value of the integrated waveform.

As described above, the synchronizing pulse delaying and shaping circuit according to the present invention uses only one capacitor for the purpose of coupling. It is therefore advantageous in that, when put into the form of an IC, it can lessen the number of terminals required for outside connection of capacitors. Moreover, the width of the output pulse does not change owing to the diode for clamping the signal at the level higher by the fixed level than the bias supply voltage, the delay circuit of a predetermined output impedance, the coupling capacitor of a predetermined constant and the resistors of predetermined constants.

What is claimed is:

1. A synchronizing pulse delaying and shaping circuit, comprising a coupling capacitor having one end connected to an input terminal receiving an integrated input pulse, a differential amplifier having one input terminal connected to the other end of said coupling capacitor, a bias power source connected to another input terminal of said differential amplifier, and a parallel circuit which consists of a diode and a resistor connected between said one input terminal and said other input terminal of said differential amplifier.

2. A synchronizing pulse delaying and shaping circuit as defined in claim 1, further including an integration circuit having its output connected to said input terminal.

3. A synchronizing pulse delaying and shaping circuit as defined in claim 2 wherein said integration circuit includes an inductor and a resistor connected in series to said one end of said coupling capacitor and a further capacitor connected between said one end of said coupling capacitor and ground.

* * * * *